Aug. 3, 1948.                R. E. RICE                2,446,193
              METHOD FOR PRODUCING HALF-TONE
                 RELIEF IMBIBITION MATRICES
Filed April 11, 1942                              2 Sheets-Sheet 1
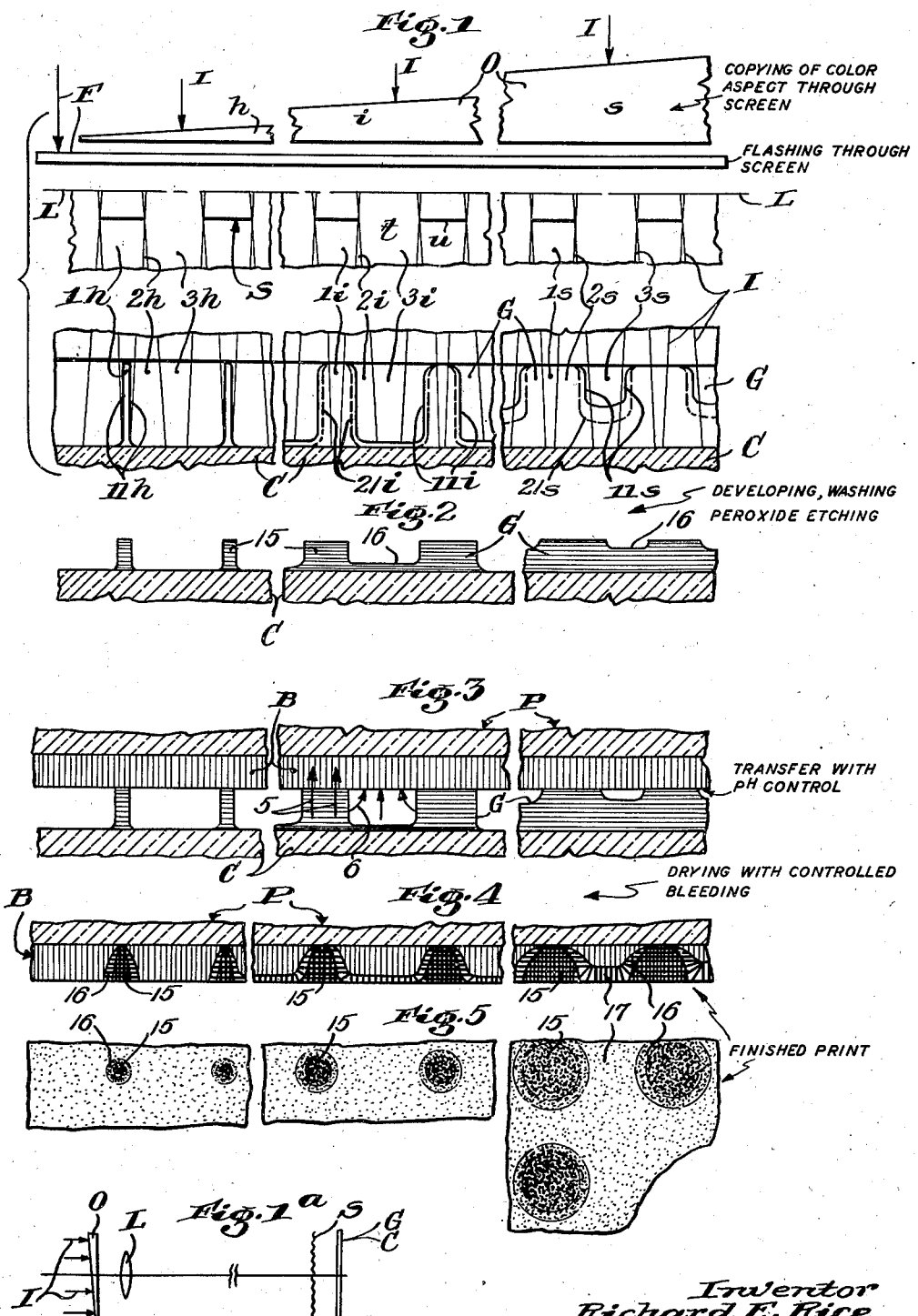
Inventor
Richard E. Rice
by Roberts, Cushman & Woodbury
his Attys.

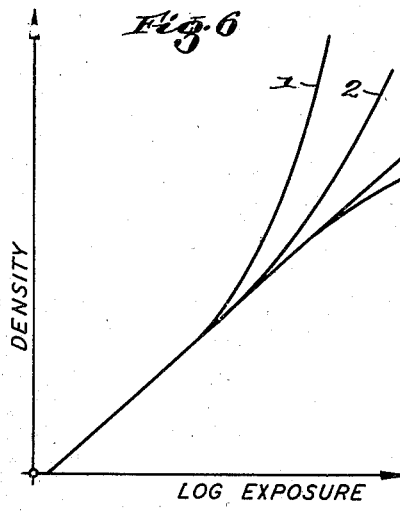
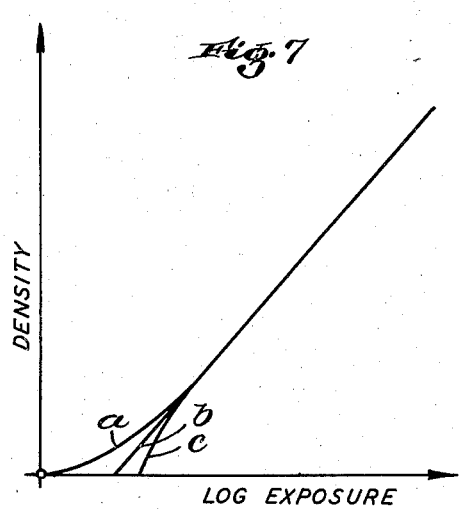
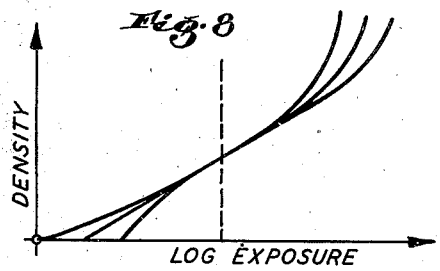
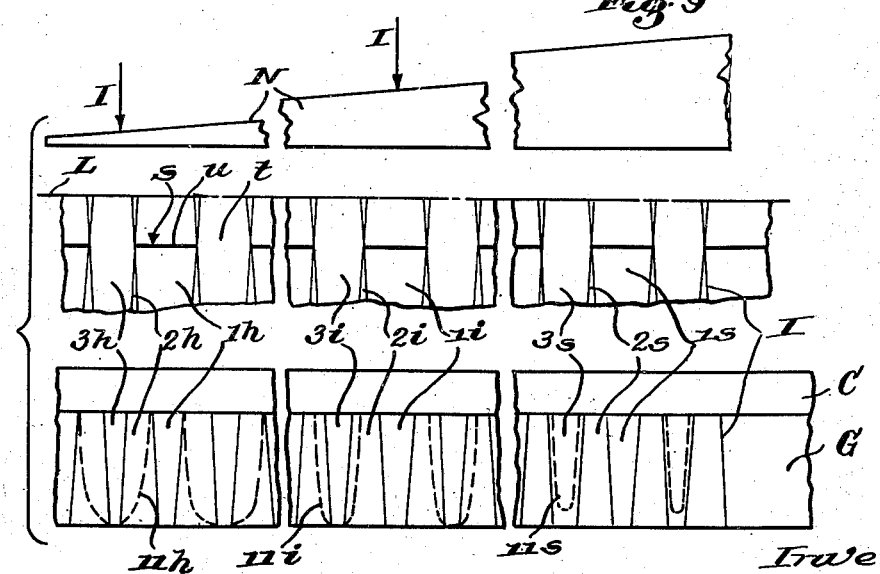

UNITED STATES PATENT OFFICE 2,446,193

METHOD FOR PRODUCING HALF-TONE RELIEF IMBIBITION MATRICES

Richard E. Rice, Waltham, Mass., assignor to I. B. Corporation, Cambridge, Mass., a corporation of Massachusetts Application April 11, 1942, Serial No. 438,632

3 Claims. (Cl. 95—5.6)

This invention relates to the art of reproducing original scenes, flat copy, or photographic records with matrices which take up dye from solutions and transfer such dye onto printing blanks, to matrices used for such transfer printing, and to the reproductions made with such matrices. Although the invention is especially useful in the field of color photography, it may be used in other branches of the art.

There are well known methods for preparing gelatin relief matrices reproducing the gradations of the original in terms of accordingly varying thickness of the gelatin which covers the entire record area. One of the most common ways to prepare such matrices is to expose a gelatin emulsion which is dyed to restrain penetration of the exposure light within the emulsion, to harden the gelatin coextensively with the exposed silver halide portions, and to dissolve the unhardened gelatin. In order to permit this dissolution or etching, the matrix emulsion is usually exposed through the support, the hardened and insoluble image remaining on said support. This necessitates projection printing for preservation of the finest definition. For contact printing the matrix emulsion may be exposed from the front, but this necessitates transferring the image onto another support. Apart from the facts that emulsion transfer is difficult and at best a delicate process, that exposure through the support requires projection printing and that special emulsions are required in order to obtain some degree of gradation control, these methods produce a matrix which prints densities varying inversely with those of the original. This requires printing the matrix from a negative of the original being reproduced, which introduces an additional, intermediate printing element if the original is not a color separation negative but a color positive, as for example the conventional integral pack developed in color by a reversal process.

For the purpose of avoiding these disadvantages, processes have been proposed which produce matrices from which imbibition prints can be made having density gradations varying directly as the gradations of the original to which the matrix was exposed. For this purpose the property of certain chemicals to dissolve gelatin under the control of developed silver, or to render the exposed and developed portions impermeable to dye is utilized. Such chemicals are hydrogen peroxide with cupric halide which can be used for making reliefs by dissolving all gelatin coextensive with a silver record exposed from the front of an emulsion, and certain bleaching and hardening solutions containing vanadium or uranium, which can be used to provide flat matrices of selectively hardened gelatin, less permeable to acid dyes in the harder portions.

The last-mentioned processes are hardly practical for various reasons such as chemical instability and costliness of the solutions, and brittleness and instability of the matrices. The peroxide process does not readily furnish satisfactory gradation characteristics, the relief contrast being mostly far too high, and also, this process, like all reversal relief processes, is dependent for the correctness of the relief upon the evenness of the original emulsion coating. It will be evident that the depth and therefore the density values of such reliefs are determined by the outer surface of the emulsion, so that the original unevenness, which might be termed manufacturing relief, is superimposed on the photograph record relief, being greater in percentage as the depth of the relief decreases.

The main objects of the present invention are to provide a quick, inexpensive method for making matrices for dye transfer which reproduce directly the gradations of an original without the use of negatives or other intermediaries, herein called "direct matrices"; to provide a process for making direct matrices in which the gradation can readily be controlled, not only in manufacture, but afterward in the imbibition process; to provide a process for making direct matrices which does not require emulsions having special characteristics, such as, for example, dye incorporated to restrain light penetration; to provide direct matrices which are relatively independent of variations in the thickness of the coating of the original matrix emulsion; to provide an imbibition print whose gradations are controllable after the dyes have been imbibed; and an imbibition matrix which has a high speed of imbibing dye and of transferring the dye to a blank, because of the unusually large surface area presented.

Other objects are to provide a gelatin dye transfer matrix whose record is essentially represented by gelatin columns of comparatively uniform height but varying diameter whose transfer properties are essentially independent of the height of the columns, and whose transfer gradation characteristic may be controlled, in addition to the column diameter, by the depth of an interstitial relief, by transfer liquor properties, by dye bleeding characteristics and by drying speed; and a picture reproduction incorporating in a dyeaccepting layer a record consisting of dye dots of comparatively constant specific dye density, which dots may be combined with an overall record of varying dye densities.

These and other objects and aspects of the invention will appear from the following description of practical embodiments illustrating the character of the invention and referring to drawings in which:

Figs. 1 to 5 show photographic material in the consecutive stages of the process, some of the dimensions of Fig. 1 being exaggerated for the sake of legibility; these figures represent, together with the legend forming a flow sheet, the various steps of the new method, and also the structures of the gelatin matrix and the final print in various stages of formation, some of which stages may be omitted;

Fig. 1a shows the approximate relation of the actual distances of the printing arrangement shown in Fig. 1;

Figs. 6, 7 and 8 show log exposure-density diagrams illustrating the gradation control possible, and gradation characteristics of the final print obtained with the new process; and Fig. 9 illustrates in the manner of Fig. 1 an embodiment employing an intermediate record.

In Fig. 1 the object field O to be reproduced is indicated by a wedge incorporating all exposure values from high lights at $h$ through the intermediate densities $i$ to the deep shadows $s$. The object field may be an actual scene, an object such as a painting, or a color transparency such as the above-mentioned color developed integral pack record, or a black and white color aspect record master positive; all these will herein be referred to as original.

The exposure takes place in a conventional camera or projection printer arrangement with a system for supplying a uniformly distributed light flux I to the original O; compare also Fig. 1a. A lens system L projects the record pattern of the original towards a screen S placed before the printing emulsion G. This screen separates the light flux into elementary beams of varying intensity determined by the shadow portions of each beam, and representing a second pattern, herein referred to as reproduction pattern.

If the original is colored, the spectral range of the printing light corresponds to the color aspect which is to be reproduced; for printing the blue aspect, in yellow dye of a subtractive integral pack record, blue light is used; for printing the green aspect in magenta dye, green light is used; and for printing the red aspect in cyan dye, red light is used.

The screen S may consist of opaque dots in a transparent field representing an irregular or regular reproduction pattern. In the present instance, circular dots form a regular pattern, the centers of the dots lying in lines perpendicular to each other and equally spaced. The spacing and diameter of the dots may vary depending on the photographic gradation desired, but a typical size and spacing would be diameters of .0025 inch, and distances between centers of .0067 inch. In Fig. 1, $t$ represents a transparent area, and $u$ an opaque area, as seen at a section through the screen taken along the centers of a line of dots.

Although the screen is herein spoken of as made up of regularly spaced opaque or transparent dots, it is understood that other forms of screens employing the same general principles could be used; for instance, the opaque or transparent areas might be regularly spaced minute bands, or they might be irregularly scattered or irregularly shaped.

If colored printing light is to be used, a panchromatic emulsion of high contrast and relatively low light restraining properties is suitable. Such a film is that known by the trade name "Agfa Reprolith Panchromatic." For the above screen with 150 dots per lineal inch, the distance from lens to screen may be approximately 12 inches, with the screen about .015 inch in front of the emulsion of about .0005 inch thickness. These dimensions will, of course, vary with varying sizes of the original and requirements for the final print, but they were found satisfactory for average conditions.

In the emulsion G on support C of Fig. 1, the zones at which the exposure controlled by the original O just attains the threshold value for the process are indicated at $1h$, $1i$ and $1s$. The gradations of the image will be seen to be expressed by two means. The first is the change in diameter of the gelatin columns in which the exposure is below threshold. The other is the thickness of gelatin emulsion near the Celluloid support, and situated in the interstices between the columns, which emulsion may also receive subthreshold exposure. The latter may be controlled independently of the first, as will be described below.

Referring to Fig. 1, and considering first the light intensities at the surface of the emulsion layer G, the regions $1h$, $1i$ and $1s$, are circular in shape, and are regions of very low, but nearly uniform light intensity, since they lie inside the umbral region behind the circular opaque dots, $u$, of the screen S, and since they represent areas receiving very little diffracted light. (The "shadow" phenomena are in fact heavily influenced by diffraction and also by light scattered in the emulsion but since the phenomena are similar in quality to what would be reproduced by the umbra and penumbra effects of a shadow, this terminology is used for the sake of simplicity.) The regions $2h$, $2i$ and $2s$ are in the shape of annular rings, and represent the areas where the light intensity varies, due to the penumbral shadow effect and due to diffraction, between the low values of $1h$, $1i$ and $1s$ and the high values of the regions $3h$, $3i$ and $3s$, which latter represent all the rest of the surface area of the emulsion G, and which receive the full intensity of the light I, reduced only in proportion to the opacity of the original O. It will be understood that the light intensities in the dark regions $1h$, $1i$ and $1s$ are very nearly equal, but that the light intensities in the bright areas $3h$, $3i$ and $3s$ vary according to the light flux transmitted by the original. Thus, the intensity at $3s$ corresponds to the light intensity at some point in the region $2i$, and the intensity at $3i$ corresponds to the light intensity at some point in the region $2h$.

Considering now the light intensities within the emulsion layer G, of Fig. 1, as the light penetrates the emulsion it is absorbed somewhat by the opacity of the silver salts within the gelatin. It should be noted in this connection that this absorption is far less than that of the special dyed emulsion layers ordinarily used for making relief matrices. Also, there is a slight scattering of the light, the effects of which will be shown below. Thus, the light intensity decreases from its maximum value at the surface to a lower value at the support. In the high light region $3h$, the light intensity is above the threshold value all the way through the emulsion layer. In the intermediate tone region $3i$, the light intensity may be reduced, due to absorption and scatter, to the threshold value near the support as shown by $11i$. In the shadow region $3s$, the intensity may fall to a threshold value nearer the surface, as shown by $11s$. In the regions $2h$, $2i$ and $2s$, the threshold will slope steeply upward from the support, the slope being determined by the combined effects of the light absorbing and light scattering properties of the emulsion.

In addition to the exposure controlled by the original O, a uniform exposure through the screen F, known as a flash exposure, may be given for the purpose of controlling the amount of interstitial gelatin to be retained on the matrix in the regions $3i$ and $3s$ after the subsequent developing and etching operations to be described below. The magnitude of the flash exposure is such that it is very small compared to the exposure controlled by the original O in the high light areas, and does not change the threshold $11h$ by a perceptible amount. In the intermediate areas, however, it may change the threshold to a position such as $21i$. In the shadow regions, the flash exposure is greater relative to the exposure controlled by the original O, and thus the threshold value becomes changed to a greater extent than in the intermediate densities, and might take the position shown at $21s$.

The magnitude of the flash exposure together with the dimension of the light source relative to that used for the exposure controlled by the original O, may be used to control the contrast of the intermediate and shadow regions without appreciably changing the high light regions. Referring to Fig. 6, the curve 1 may represent the density plotted against log exposure curve obtained upon making an imbibition transfer from a matrix having had no flash exposure, while curves 2, 3 and 4 show the effect of flash exposures of increasing magnitudes, respectively.

The flashing control is especially valuable because the dot matrices according to the invention have inherently very high contrast in the shadow regions, and without the flash the high densities might be above the maximum density where detail is reproducible. As will be clear from the above explanation with reference to Fig. 1, even considerable flash exposures have little or no effect in the high lights, but can be used to lighten the shadows to any desired degree; this is in effect a flattening of the upper portion of the log exposure-density characteristic.

The emulsion is then developed, preferably in a contrasty developer. The development as above pointed out, may be so regulated that a certain thickness of interstitial unexposed emulsion remains between the columns which extend through the entire emulsion; the contrastier the developer and the longer the development time, the less interstitial gelatin will be obtained. Under average conditions, development for two minutes with a developer known under the trademark "Kodalith" is suitable.

After development and washing, the film is etched in a peroxide bath, for example of the following composition:

|  | Cc. |
|---|---|
| $CuSO_4$ (sat. sol.) | 40 |
| HCl (conc.) | 40 |
| $H_2O_2$ (30%) | 400 |
| Water to make | 4000 |

This solution oxidizes the developed silver and decomposes and dissolves the gelatin only coextensively with the silver particles, leaving on the support the gelatin below the threshold lines indicated by $11h$, $21i$ and $21s$, in Fig. 1.

The matrix thus obtained consists of gelatin columns 15 of varying diameter attached to the support, with or without interstitial gelatin 16 of varying height; both columns and interstitial gelatin being suitable to take up coloring matter by sorption. Such a matrix is shown in Fig. 2 which shows high light, intermediate and shadow density portions corresponding to Fig. 1.

The matrix may then be soaked in a conventional acid dye solution suitable for imbibition transfer whose spectral characteristic corresponds to the color aspect which the matrix represents, for example in yellow dye for the aspect taken through the blue filter. It is thereafter, within a bath herein referred to as transfer liquor, contacted under pressure with a blank film P (Fig. 3) into whose gelatin emulsion B the dye transfers from the matrix. Especially if interstitial gelatin is present, this transfer will depend a good deal upon the chemistry of the transfer liquor; as indicated in Fig. 3, the dye will not only transfer directly (at 5) from matrix column into blank, but also to a greater or lesser degree (at 6) through the liquor between blank and interstitial relief, because as shown in Fig. 3 the interstitial gelatin of the matrix does not come in direct contact with the blank.

If the liquor is more alkaline, it takes up and transports dye to the blank, whereas an acidic liquor causes the dye to remain in the matrix gelatin, except at the areas of direct contact. Therefore, the interstitial gelatin will affect the final print only if a more or less alkaline transfer liquor is used; it can be practically suppressed if the liquor is acidic. A transfer liquor of intermediate pH value is obtained by dissolving about 5.0 grains of borax per gallon of distilled water; a dyed up matrix of the type described will transfer in such a liquor an amount of interstitial dye which is desirable for normal prints.

The print is then dried, the drying step being preferably used as explained below, for further density control of the print.

The transfer dyes bleed within the blank emulsion to a varying but always minute degree, which depends upon the nature of the dye itself, upon the drying time and upon the nature of the blank coating. The bleeding herein referred to should not be confused with the undesirable bleeding of the conventional dye transfer print, which bleeding is greater in extent, and so impairs definition and may cause color fringes. In a print of the nature herein described, the definition depends largely upon the dot spacing. The bleeding herein referred to is kept less in extent than the dot spacing and so affects merely the interstitial areas and can be used without loss of definition to control the contrast characteristic.

As far as the bleeding characteristics of the dyes themselves are concerned, various dyes and dye mixtures of suitable properties in this respect are obtainable. As regards the blank coating, hardening and mordanting the gelatin with aluminum compounds renders it resistant to too rapid bleeding of acid dyes.

The drying time affects the bleeding to a considerable degree; a print in a properly selected dye which is quickly dried, for example under a heat radiator, may show practically no bleeding, whereas prints can be dried so slowly that the dots disappear almost entirely. The above-described transfer liquor control may, of course, be used in addition to this technique of modifying the interstitial dye record.

Figs. 4 and 5 show the effect of this drying-time control. Fig. 4 represents a section through the blank along the centers of a line of dots. Fig. 5 represents a plan view of the blank. Since all the gelatin columns of the matrix regardless of diameter contain dye of similar concentration, the areas indicated by 15, representing dye transferred by direct contact, also contain dye of similar concentration, regardless of diameter. These direct transfer regions will contribute to the picture gradations according to the ratio of their areas to the areas of the space between them. This picture gradation may be modified, as stated above, by controlled bleeding of this dye, in which case, the dots 15, will be surrounded by zones, indicated at 16, of dye decreasing radially in concentration. Superimposed on this picture gradation may be the second component of picture gradation resulting from the dye imbibed through the transfer liquor from the interstitial matrix gelatin, as indicated at 6 of Fig. 3. This is illustrated at 17, Figs. 4 and 5. This dye is effective mainly in the shadow portions, but may extend into the intermediate portions to whatever extent is desired, since it is independently controlled by the flash exposure as previously described.

The reproduction can be further controlled by selecting certain screen characteristics, as element size and ratio of opaque to transparent areas, by varying for a given screen the aperture which projects the image toward the screen, and by changing the distances between lens and screen and screen and emulsion. These expedients permit variations in the shape of the characteristic log exposure-density relation of the reproduction.

Referring especially to the above-mentioned control by varying the relative extent of opaque and transparent screen areas, larger opaque screen dots require a longer or more intense exposure controlled by the original O in order to produce gelatin columns of the proper size on the matrix. A more intense exposure produces more scatter light originating in $3h$, Fig. 1, and also in the brighter parts of region $2h$. This scatter light changes the positions of the thresholds $11h$, $11i$ and $11s$, in the direction which decreases the diameters of the gelatin columns. However, being greatest in magnitude in the high light regions, the position of the threshold $11h$ undergoes a greater change than $11i$ or $11s$, thus producing a change in the shape of the density-log exposure relation. This is indicated in Fig. 7 where curve $a$ indicates the gradation which can be obtained by the use of a screen whose opaque areas are small relative to its transparent areas, and curves $b$ and $c$ represent the gradation which can be obtained by using screens whose opaque areas are larger, relative to their transparent areas.

With the above-described control by means of the screen characteristics, the contrast in the high light region can be controlled; the flash exposure permits control of the intermediate and shadow regions, and the dye transfer and bleeding controls permit changes of the same nature; it will, therefore, be evident that the new process provides a wide range of strictly controllable contrast variations. Fig. 8 reproduces H and D characteristics of final prints actually obtained and indicates that the gradation in the lower densities can be made practically straight which is desirable for this region in order to secure proper detail, whereas the higher densities can be reproduced with upwardly curving characteristics in order to obtain strong shadows, with any desirable amount of detail. It is possible to combine any gradation configuration of Fig 6 with any configuration of Fig. 7.

As pointed out above, the matrix according to the present invention greatly minimizes the detrimental effects of unevenness in the emulsion coating. In the high light regions where evenness is most vital, the density gradations of the matrix and transfer therefrom depend only upon the lateral extension of the gelatin columns and are independent of unevenness of emulsion coating. In the intermediate density regions, where the amount of interstitial gelatin is small, the density gradations vary with emulsion thickness only to the very slight extent to which interstitial gelatin is present. In the shadow regions, unevenness is much less important. Here, in a practical application, the interstitial gelatin might be responsible for 25-50% of the picture density. It is therefore only to this fractional extent that the density depends on the evenness of the original emulsion coating. Practice has shown any such unevenness to be unimportant in these high densities.

It should further be noted that the present invention provides for improved reproduction of the shadow regions, for the following reason. In the known photomechanical processes upon passing from lighter to very high densities, the dark dots become larger, and before the highest densities are reached, this enlargement causes these dots to coalesce into a connected network, the ground between them shrinking instead into separated dots. This same phenomenon also tends to occur in the present process, but generally to a much lesser extent, since the interstitial density produces the high-density contrast which prior photomechanical processes attain only by coalescense of the dark dots.

On the other hand it was found that the process according to the present invention is suited to provide a certain, preferably very slight amount of interstitial color even between the smallest dots in the regions of densities next to the brightest high lights without any dots. This condition appears to be beneficial especially regarding the visual effect of a final color print combined from several matrices representing different color aspects.

Because of the high degree of gradation control possible with this process, and because of the simplicity and economy of the operations involved, it might be desirable in certain cases to make matrices reproducing the density gradations of an original scene through the medium of intermediaries such as, for example, separation negatives made in a one-shot camera. In this case, the original N, Fig. 9, represents a negative of the original scene. The matrix must now be made to reproduce the gradations of N, Fig. 9, inversely.

To accomplish this, the screen described above may be replaced by one which, in relation to the above-described screen, might be termed a "negative screen"; that is, it may consist of transparent areas in an opaque field. After exposure through such a screen and development, the silver image is dissolved out, the remaining silver salts exposed and developed, and the gelatin coextensive with the final silver image dissolved away by means of the above-described peroxide etching bath.

The following describes, with reference to Fig. 9, a practical example of this phase of the invention. In this figure the negative of original N may be one color aspect of a scene as represented by a separation negative, or by one component of a negative color-developed integral pack record. The screen S may consist of a regular pattern of circular transparent dots $t$ in the opaque field $u$. The spacing and diameter of the dots may vary, but dimensions which have been found satisfactory are, diameters of .0025 inch, and distances between centers of .0067 inch. A suitable film is "Agfa Reprolith Panchromatic." The film is placed preferably with its support side facing the screen. This distance between screen and emulsion may be .015 inch. The exposure is the same as in the example given above, except that a flash exposure is seldom necessary.

The light patterns which are produced in this case are similar to those described above with reference to Fig. 1, except that they are reversed. Referring to Fig. 9, the light pencils projected onto the film emulsion G by the transparent apertures $t$ of the screen give rise to regions $3h$, $3i$ and $3s$ receiving full light intensity except for the absorption by the negative N; the regions $2h$, $2i$ and $2s$, of varying light intensity; and the regions $1h$, $1i$ and $1s$, of very low light intensity. As stated above, these conditions result from the combined influences of diffraction, umbral and penumbral shadows, and light scatter by the silver salts in the emulsion.

The film may be developed 2 minutes at 70° F. in a very contrasty developer such as that known by the trade name "Kodalith," which produces silver within the regions bounded by $1h$, $1i$ and $1s$, Fig. 9. After washing the gelatin substantially free from developer, the silver may be dissolved by bathing the film in a permanganate solution having for example the composition:

| | | |
|---|---|---|
| $KMnO_4$ | grams | 1 |
| $H_3PO_4$ | cubic centimeters | 2 |
| Water | do | 100 |

The film may be cleared in a 2% solution of $NaHSO_3$, followed by washing, exposure to intense light, and redevelopment in "Kodalith" developer until all the remaining silver salt is developed. After washing, and upon etching in peroxide in the manner described above, the gelatin coextensive with the developed silver dissolves away, leaving the regions bounded by $1h$, $1i$ and $1s$ upon the support. The relief thus produced consists of gelatin columns varying in diameter inversely with the gradations of the negative N.

The making of prints from this relief may be like that of the above-described "direct matrices," and the control over print gradation by means of dye bleeding after imbibition, and by transfer liquor may be utilized.

A further control over the shadow gradations may be secured by varying the screen characteristics, and the light scattering and light absorbing properties of the film. The slope of the density-log exposure curve may be increased, for example, by increasing the distance between the screen and film, or by increasing the number of screen dots, per unit area. An increase in slope may also be obtained by decreasing the light-absorbing properties of the film.

It should be understood that the present disclosure is for the purpose of illustration only and that this invention includes all modifications and equivalents which fall within the scope of the appended claims.

I claim:

1. In the art of photographic reproduction the method of controlling the contrast characteristic of matrices for use in making prints by dye imbibition, which method consists essentially in exposing through a half tone screen a silver halide matrix emulsion to an object field, said screen and said field together defining light beams of varying intensity distributed in a pattern of elementary areas which pattern is determined by the screen whereas the varying intensity of the beams is determined by the object field, said emulsion having sufficient thickness so that the beams will expose the emulsion through its entire thickness in the regions of highest exposure and through only part of its thickness in the regions of lowest exposure; exposing said areas of said matrix emulsion through a half tone screen defining said pattern, to a substantially uniform object field to such an extent as to vary depth and area of said first exposure at least in the regions of lowest exposure; and etching said matrix emulsion by substantially removing in said areas said exposed emulsion portions, thereby to form interstitial depressions distributed in said screen pattern and having depth determined by said exposures of said matrix emulsion.

2. The method according to claim 1, wherein the matrix is etched in a bath containing hydrogen peroxide.

3. The method according to claim 1 wherein said object field is a photographically positive transparency, the matrix likewise representing a positive.

RICHARD E. RICE.

REFERENCES CITED

The following references are of record in the file of this patent:

UNITED STATES PATENTS

| Number | Name | Date |
|---|---|---|
| 1,288,753 | Thornton | Dec. 24, 1918 |
| 1,408,315 | Thornton | Feb. 28, 1922 |
| 1,939,219 | Mees | Dec. 12, 1933 |
| 2,013,116 | Troland | Sept. 3, 1935 |
| 2,029,077 | Lejeune | Jan. 28, 1936 |
| 2,039,195 | Stirling | Apr. 28, 1936 |
| 2,058,396 | Baker | Oct. 27, 1936 |
| 2,182,814 | Marasco | Dec. 12, 1939 |
| 2,188,697 | Yanes | Jan. 30, 1940 |
| 2,211,807 | Yanes | Aug. 20, 1940 |
| 2,283,715 | Yanes | May 19, 1940 |

FOREIGN PATENTS

| Number | Country | Date |
|---|---|---|
| 5,100 | Great Britain | 1915 |

OTHER REFERENCES

"British Journal of Photography," March 22, 1940, pp. 135 and 136.